(12) United States Patent
Naito

(10) Patent No.: US 8,103,474 B2
(45) Date of Patent: Jan. 24, 2012

(54) DEBUG SYSTEM

(75) Inventor: Norihiro Naito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 415 days.

(21) Appl. No.: 12/306,532

(22) PCT Filed: May 28, 2007

(86) PCT No.: PCT/JP2007/060830
§ 371 (c)(1),
(2), (4) Date: Dec. 24, 2008

(87) PCT Pub. No.: WO2008/032477
PCT Pub. Date: Mar. 20, 2008

(65) Prior Publication Data
US 2009/0312978 A1 Dec. 17, 2009

(30) Foreign Application Priority Data
Sep. 15, 2006 (JP) ................................. 2006-251363

(51) Int. Cl.
*G01R 27/28* (2006.01)
(52) U.S. Cl. .......................................... 702/117; 714/27
(58) Field of Classification Search .................. 702/108, 702/117, 118, 120
See application file for complete search history.

(56) References Cited

U.S. PATENT DOCUMENTS

| 5,978,937 A | * | 11/1999 | Miyamori et al. | ............... 714/45 |
| 6,868,510 B1 | | 3/2005 | Nozu | |
| 2002/0040518 A1 | * | 4/2002 | Butts et al. | ................. 29/603.09 |

FOREIGN PATENT DOCUMENTS

| JP | 62-78608 A | | 4/1987 |
| JP | 64-48137 A | | 2/1989 |
| JP | 8-181736 A | | 7/1996 |
| JP | 9-54766 A | | 2/1997 |
| JP | 10-32886 A | | 3/1998 |
| JP | 11-15690 A | | 1/1999 |
| JP | 2001-92727 A | | 4/2001 |
| JP | 2003-23431 A | | 1/2003 |
| JP | 2003023431 A | * | 1/2003 |
| JP | 2003-316601 A | | 11/2003 |

OTHER PUBLICATIONS

English Machine translation of JP 2003023431.*

* cited by examiner

*Primary Examiner* — Manuel L Barbee
(74) *Attorney, Agent, or Firm* — Birch, Stewart, Kolasch & Birch, LLP

(57) ABSTRACT

A debug system includes equipment to be debugged (onboard information equipment 10) which is controlled by a microcomputer 11; and a command return jig 20 which is connected to the equipment to be debugged via a communication interface unit 12, receives a specific command generated and output by the microcomputer 11 via the communication interface unit, and outputs the specific command by return to the equipment to be debugged, wherein the equipment to be debugged switches, when receiving the specific command from the command return jig, the microcomputer to set it in an operation environment the microcomputer does not use normally.

7 Claims, 5 Drawing Sheets

DEBUG SYSTEM

TECHNICAL FIELD

The present invention relates to a debug system suitable for a use for carving out equipment diagnosis by setting equipment to be debugged such as an onboard information appliance before factory shipment in a specific operation environment.

BACKGROUND ART

In onboard information equipment such as a car navigation system before factory shipment, a microcomputer working as the control center of the onboard information equipment is often connected to a PC (Personal Computer) serving as a diagnostic apparatus via a serial communication channel (serial communication interface unit) to inform the outside of the internal state of the microcomputer.

In the foregoing connecting configuration, the microcomputer receives a command from the PC, and carries out operation in accordance with the command. For example, when the input command intends a "memory dump", the microcomputer outputs its dump list to the PC. Program developers analyze the dump list they get using the memory dump function, and carry out debug and the like of the program to develop the program and check its operation.

The foregoing memory dump function is sometimes used for checking on a mass production line after mass production following the program development. For example, it sometimes occurs that the operation environment of the microcomputer should be set in a specific operation mode (called "check mode" from now on) that the microcomputer does not use normally, such as disabling a display command to check the onboard information equipment to which a display monitor is not yet connected. Conventionally, such setting becomes possible by switching the operation mode of the onboard information equipment to the operation environment the microcomputer working as the control center does not use normally by inputting a command (such as "CHECK") for switching to the check mode from the PC (see Patent Document 1 and Patent Document 2, for example).

Patent Document 1: Japanese Patent Laid-Open No. 62-78608/1987.

Patent Document 2: Japanese Patent Laid-Open No. 9-54766/1997.

According to the conventional arts including the techniques disclosed in the Patent Document 1 and Patent Document 2, to input a command to the equipment to be debugged such as the onboard information equipment, a comparatively large-scale expensive external apparatus must be connected as equipment like a PC. In addition, another problem arises of being unable to confirm as to whether the equipment to be debugged such as the onboard information equipment before shipment is currently set in the check mode, a special operation environment, or not externally.

The present invention is implemented to solve the foregoing problems. Therefore it is an object of the present invention to provide a debug system capable of changing, when setting the microcomputer, which works as the control center of the equipment to be debugged such as the onboard information equipment, in the operation environment the microcomputer does not use normally, the operation mode easily by inputting a command using a jig with a simple structure.

DISCLOSURE OF THE INVENTION

A debug system in accordance with the present invention includes: equipment to be debugged, which is controlled by a microcomputer; and a command return jig connected to the equipment to be debugged via a communication interface unit, for receiving a specific command generated and output by the microcomputer via the communication interface unit, and for outputting the specific command by return to the equipment to be debugged, wherein the equipment to be debugged switches, when receiving the specific command from the command return jig, the microcomputer to set the microcomputer in an operation environment the microcomputer does not use normally.

According to the present invention, the jig with a simple structure is used to set the microcomputer, which works as the control center of the equipment to be debugged such as onboard information equipment, in the operation environment the microcomputer does not use normally. This makes it possible to change the operation mode easily by inputting the command.

BEST MODE FOR CARRYING OUT THE INVENTION

The best mode for carrying out the invention will now be described with reference to the accompanying drawings to explain the present invention in more detail.

Embodiment 1

Figure 1:
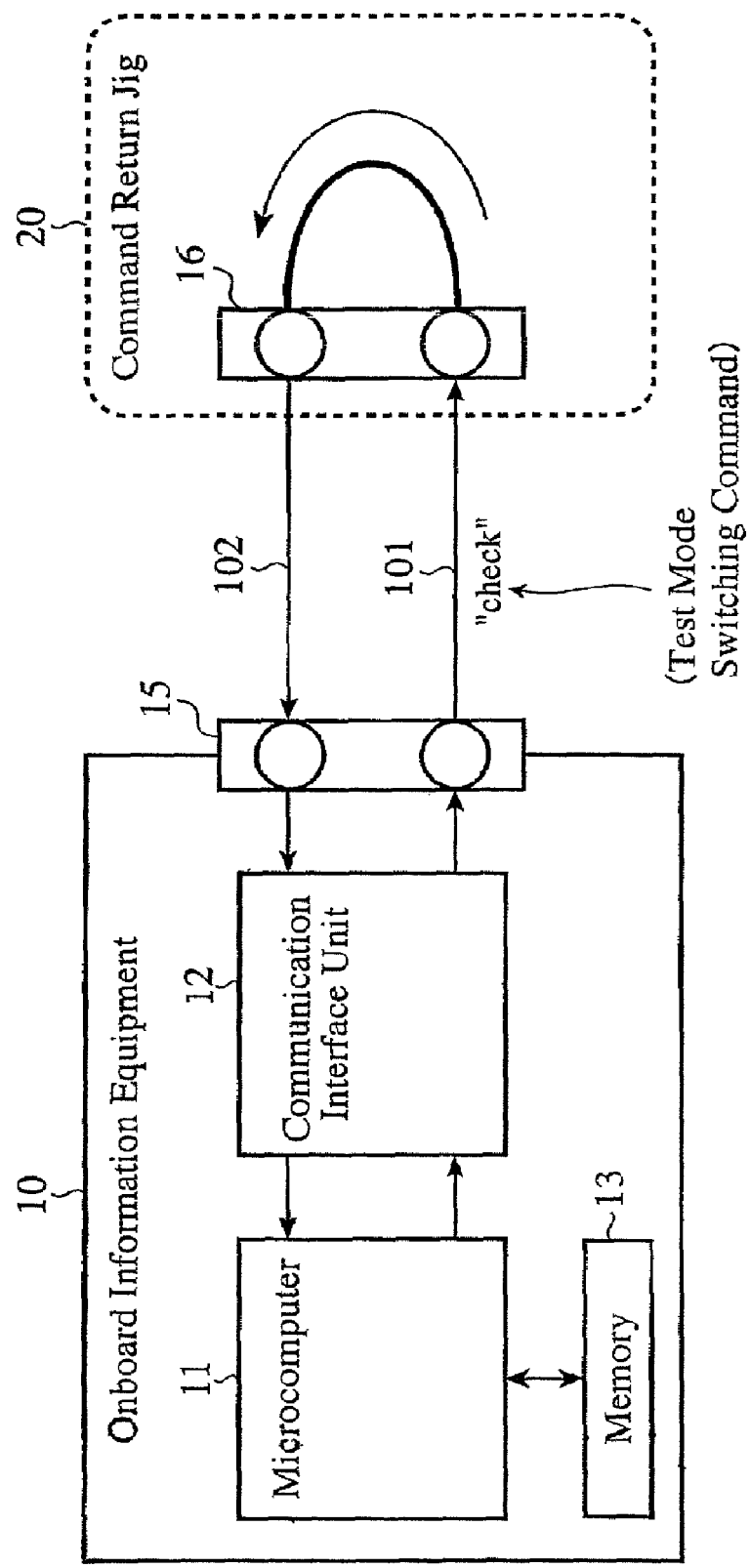
FIG. 1 is a block diagram showing a configuration example of a debug system of an embodiment 1 in accordance with the present invention.

FIG. 1 is a block diagram showing a configuration example of a debug system of an embodiment 1 in accordance with the present invention.

As equipment to be debugged, onboard information equipment 10 is illustrated here. The onboard information equipment 10 shown here comprises a microcomputer 11 working as a control center; a communication interface unit 12 connected as a connection interface with an external connection device; and a memory 13 for storing data passing through the processing by the microcomputer 11.

In addition, a command return jig 20 is shown here as an example of the external connection device. The command return jig 20 is attached to the onboard information equipment 10 via a connector 15 to return the command output from the onboard information equipment 10 to the onboard information equipment 10 via command transfer lines 101 and 102. Alternatively, the command return jig 20 can be a hardware tool having a simple circuit configuration for returning the command only via a driver circuit not shown inserted between the command transfer line 101 and the command transfer line 102.

The onboard information equipment 10 and the command return jig 20 are connected via connectors 15 and 16 mounted on them, respectively.

Incidentally, the onboard information equipment 10 (microcomputer 11) and the command return jig 20 are connected via a serial data transfer path (command transfer lines 101 and 102). In addition, the communication interface unit 12 is a voltage level converter for matching, when the onboard information equipment 10 performs communication with the external connection equipment, the voltage level of the communication signal between the onboard information equipment 10 and the external connection device.

Figure 2:
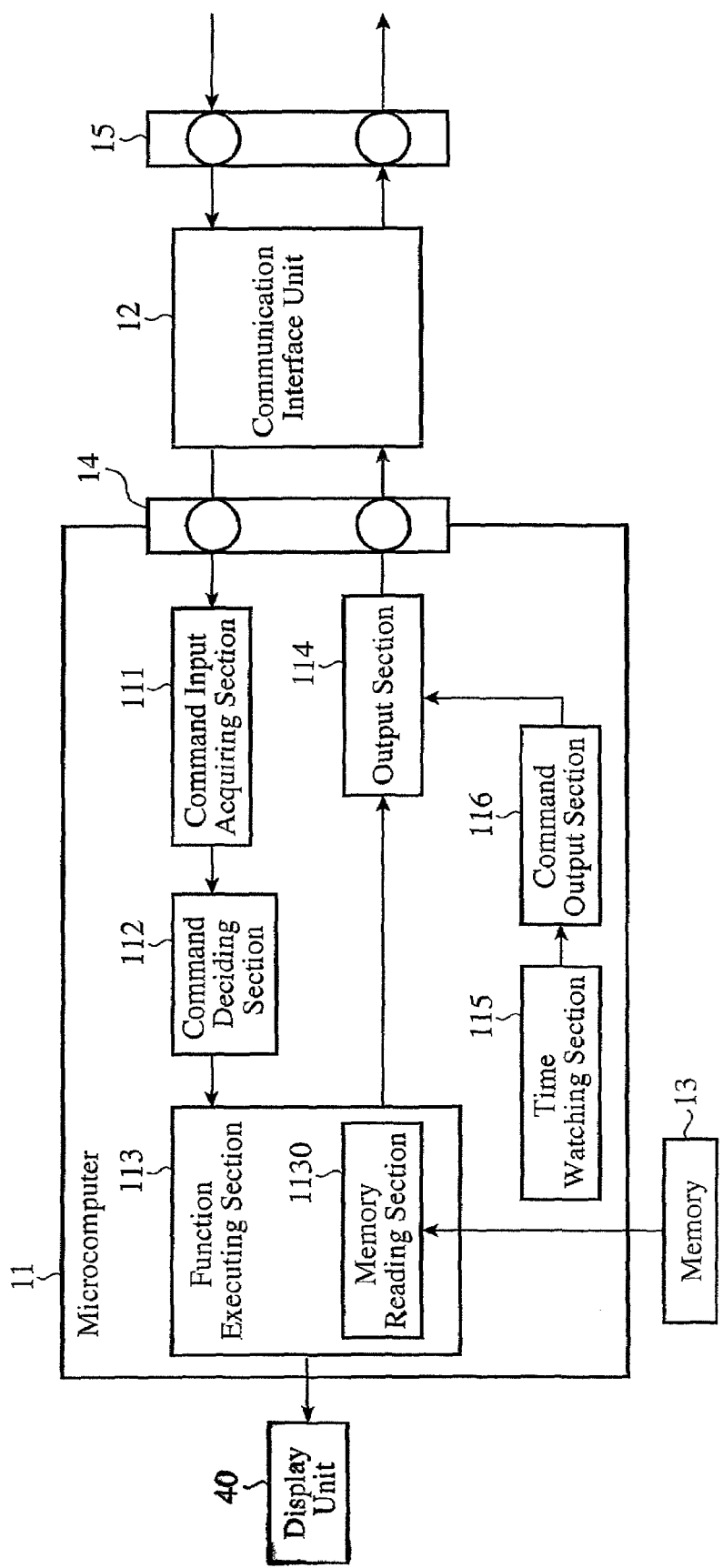
FIG. 2 is a block diagram showing an internal configuration of a microcomputer shown in FIG. 1 with its functions being developed.

FIG. 2 is a block diagram showing an internal configuration of the microcomputer 11 working as the control center of the onboard information equipment 10 shown in FIG. 1 with its functions being developed.

In FIG. 2, the configuration of the microcomputer 11 are roughly divided, in accordance with its functions, into a command input acquiring section 111, a command deciding section 112, a function executing section 113, an output section 114, a time watching section 115 and a command output section 116.

The command input acquiring section 111 has functions of acquiring a command the command return jig 20 returns and transmits, and of outputting it to the command deciding section 112. The command deciding section 112 has functions of deciding the content of the command input and acquired to control the function executing section 113.

The function executing section 113 is a program executing means for executing prescribed functions in accordance with the content decided by the command deciding section 112. For example, if the command requires the memory dump, it acquires the contents of the memory 13 from it (memory reading section 1130). In this case, the output of the function executing section 113 (a dump list, for example) is supplied to the communication interface unit 12 via the data output section 114 for outputting to the external connection device such as a PC, and via the input/output port 14. Thus, if the switching is made to set the operation environment the microcomputer 11 does not use normally, the function executing section 113 operates as a first diagnostic function executing section described in claim 4 for executing equipment diagnosis in accordance with the specific operation environment based on the specific command.

The time watching section 115 has functions of measuring time for watching the designated time under the control of the microcomputer 11, and of controlling the command output section 116.

The command output section 116 has functions of outputting, instead of the output of the function executing section 113, the same command as a command input from the outside of the onboard information equipment 10 during the time measured by the time watching section 115, one minute, for example.

Figure 3:
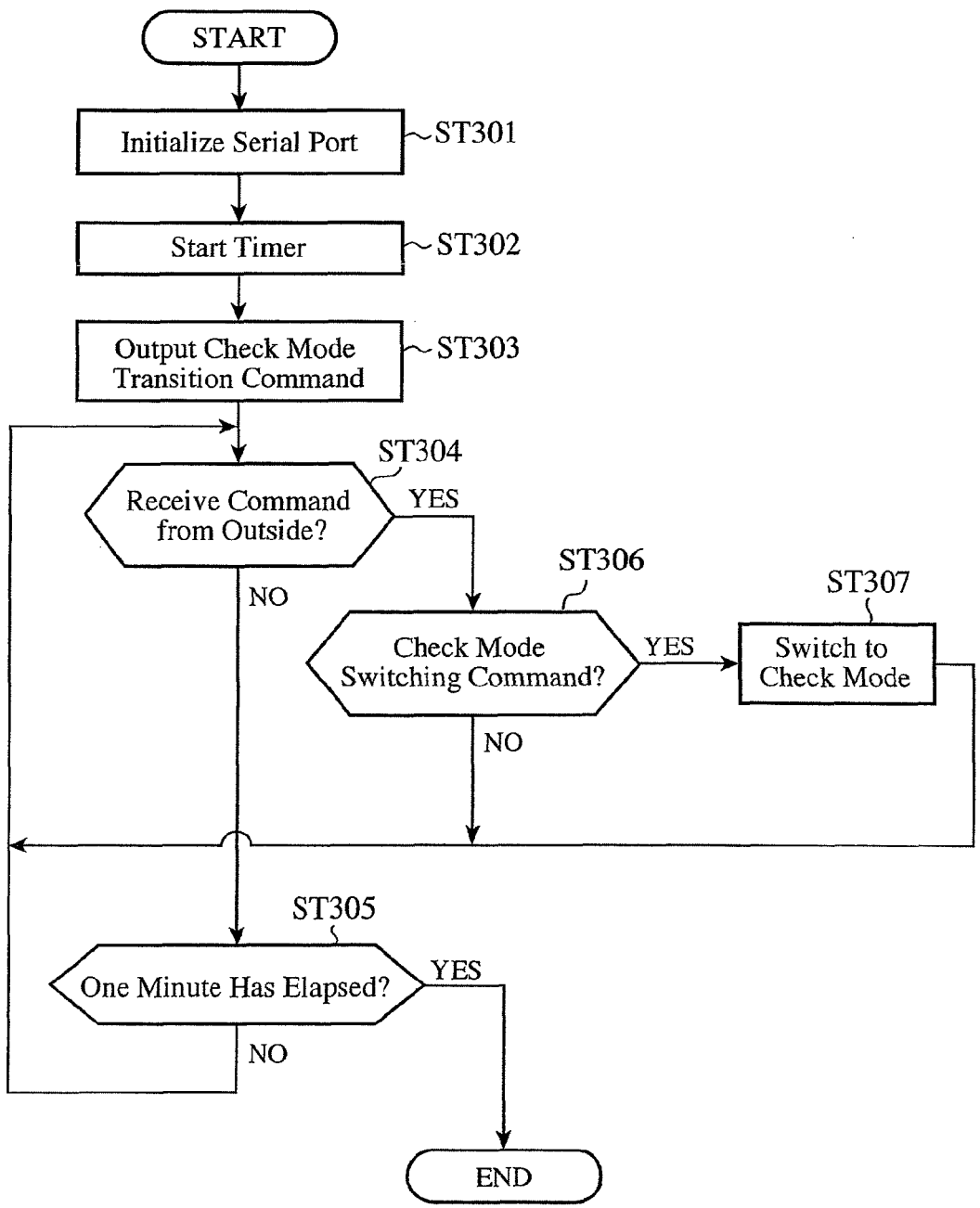
FIG. 3 is a flowchart shown to explain the operation of the debug system of the embodiment 1 in accordance with the present invention.

FIG. 3 is a flowchart shown to explain the operation of the debug system of the embodiment 1 in accordance with the present invention.

Referring to the flowchart shown in FIG. 3, the operation of the embodiment 1 in accordance with the present invention shown in FIG. 1 and FIG. 2 will now be described in detail.

After the onboard information equipment 10 is switched on and started, if it is desired to switch the onboard information equipment 10 to the check mode used on the mass production line, for example, the command return jig 20 is attached to the exclusive connector 15 in advance.

After starting the onboard information equipment 10, the microcomputer 11 initializes the serial port 14 for debugging, first, so as to set the microcomputer 11 at a state capable of communicating with the external connection device (the command return jig 20, here) (step ST301).

After the initialization, the microcomputer 11 starts the timer of the time watching section 115 to wait for a certain time after starting the command for setting the microcomputer 11 itself at the check mode (step ST302). Subsequently, using the command output section 116, the microcomputer 11 outputs the command "check" for switching the microcomputer 11 to the check mode via the output section 114, the serial port 14 and the communication interface unit 12 (step ST303).

After outputting the command "check", the microcomputer 11 waits for the command, which will be output and returned from the command return jig 20 and then input, for the designated time measured by the time watching section 115, for one minute, for example (steps ST304 and ST305).

To set the onboard information equipment 10 in the check mode to establish the specific operation environment, it is enough to input the command "check" to the microcomputer 11 as described above. Since the command return jig 20 is attached in the embodiment 1 in accordance with the present invention, the command "check" output at step ST303 is acquired by the command input acquiring section 111 within one minute for returning via the communication interface 12 and the serial port 14 of the onboard information equipment 10.

When the command is input and acquired within one minute after the start, the command deciding section 112 makes a decision as to whether it is a check mode switching command "check" or not (step ST306). If it is the check mode switching command ("Yes" at step ST306), the function executing section 113 switches the operation mode of the microcomputer 11 to the check mode to establish the specific operation environment (step ST307).

In this case, since the command return jig 20 is attached to the onboard information equipment 10, the other commands are never input.

As described above, according to the embodiment 1 in accordance with the present invention, it is possible to switch and set the equipment to be debugged such as the onboard information equipment 10 in the operation environment the microcomputer 11 does not use normally (check mode, here) by only attaching the command return jig 20 with a simple structure as the external connection device without using comparatively large-scale expensive equipment such as a PC.

Incidentally, as diagnostic items under the operation environment the microcomputer 11 does not use normally, it is conceivable, for example, to ignore a display command, to extend the time period of activating under special conditions, to turn on a lamp if a particular function is executed when the command return jig 20 is attached, and to disable a certain monitoring function.

In addition, since the command return jig 20 is attached, it becomes possible to make a decision as to whether the onboard information equipment 10 is set in the check mode or not at the first glance. Accordingly, it goes without saying that the embodiment 1 can be effectively applied to the equipment to be debugged before the factory shipment such as that to which a display monitor is not yet connected, for example.

Incidentally, such a configuration is also possible which has lamps connected to the onboard information equipment 10, and turns on a lamp when receiving a specific command output and returned from the command return jig 20 within one minute the time watching section 115 monitors, thereby displaying that the microcomputer is switched to and set in the operation environment the microcomputer 11 does not use normally.

Embodiment 2

Figure 4:
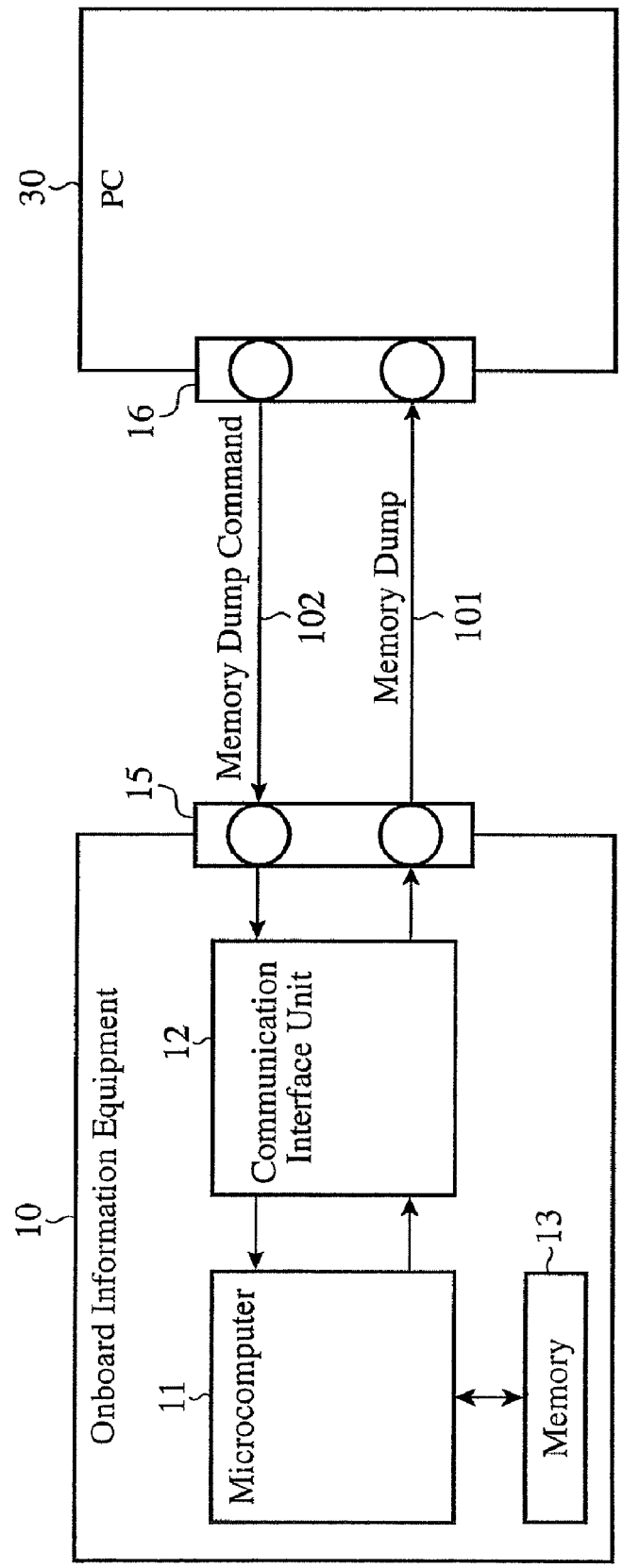
FIG. 4 is a block diagram showing a configuration example of a debug system of an embodiment 2 in accordance with the present invention.

FIG. 4 is a block diagram showing a configuration example of a debug system of an embodiment 2 in accordance with the present invention.

The embodiment 2 differs from the embodiment 1 shown in FIG. 1 in that a PC 30 working as a diagnostic apparatus is connected to the onboard information equipment 10 instead of the command return jig 20. In this case, it goes without saying that the PC 30 can not only switch and set the microcomputer 11 serving as the control center of the onboard information equipment 10 in the specific operation environment the microcomputer 11 does not use normally, but also input a debug command such as a memory dump and diagnostic command, and obtain the results.

As for the functional configuration of the microcomputer 11, it is assumed that the same configuration as that of the embodiment 1 shown in FIG. 2 is employed. However, as for the function executing section 113 shown in FIG. 2, it differs here in that it operates as a second function executing section described in claim 5. In this case, it goes without saying that the function executing section 113 can execute not only the specific command (check mode switching command "check") output from the PC 30 connected via the communication interface unit 12, but also the diagnostic command such as a debug command independently of the waiting within the designated time period. Its details will be described later.

Figure 5:
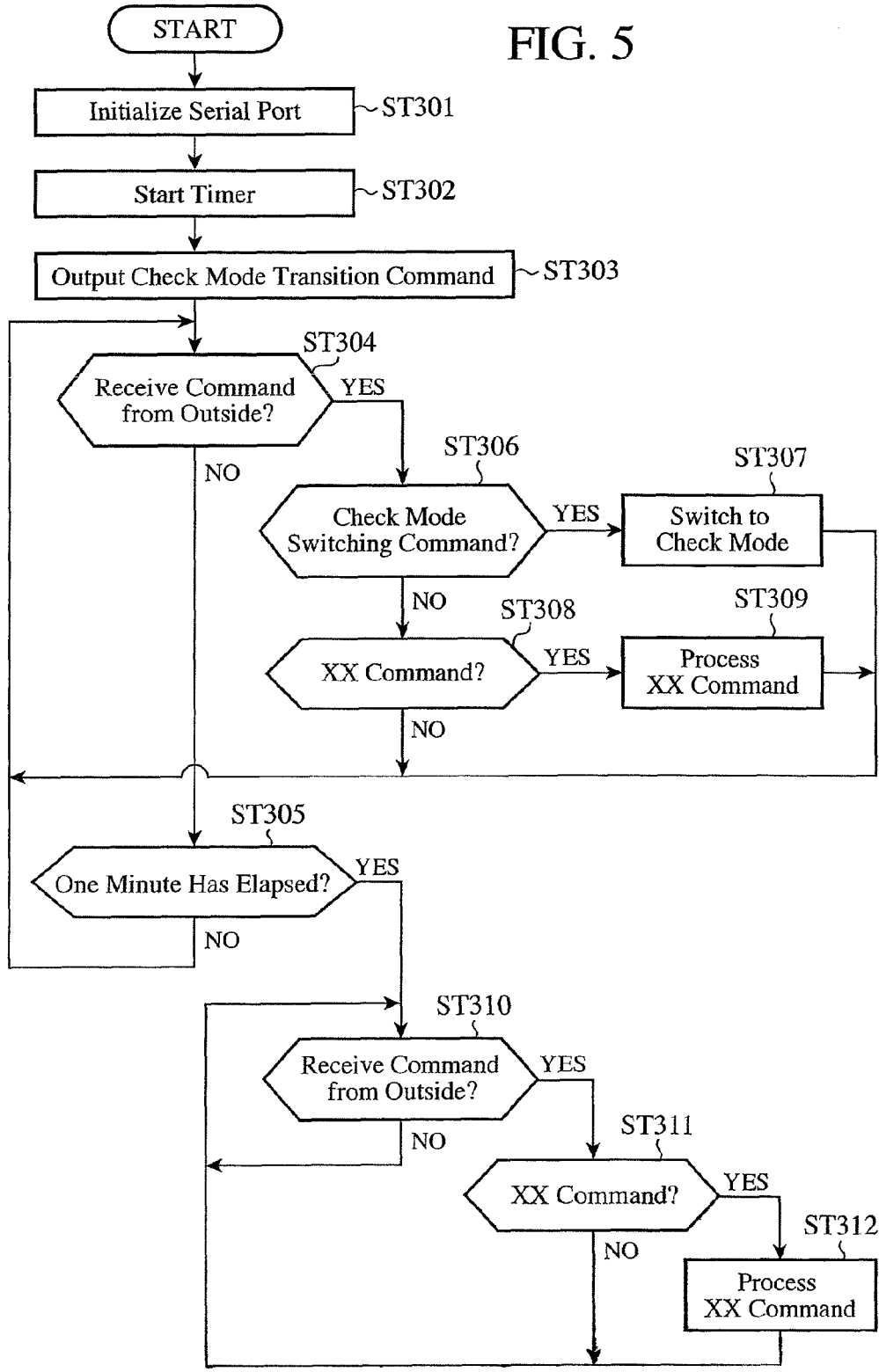
FIG. 5 is a flowchart shown to explain the operation of the debug system of the embodiment 2 in accordance with the present invention.

FIG. 5 is a flowchart shown to explain the operation of the debug system of the embodiment 2 in accordance with the present invention.

Referring to the flowchart shown in FIG. 5, the operation of the embodiment 2 in accordance with the present invention shown in FIG. 2 and FIG. 4 will now be described in detail.

After the onboard information equipment 10 is switched on and started, the microcomputer 11 initializes the serial port 14 for communicating in the same manner as in the embodiment 1, first, so as to set the microcomputer 11 at a state capable of communicating with the external connection device (the PC 30 connected as the diagnostic apparatus, here) (step ST301).

After the initialization, the microcomputer 11 starts the timer of the time watching section 115 to wait for a certain time after starting the command for setting the microcomputer 11 itself at the check mode (step ST302). Subsequently, using the command output section 116, the microcomputer 11 outputs the command "check" for switching the microcomputer 11 to the check mode on the mass production line via the output section 114, the serial port 14 and the communication interface unit 12 (step ST303).

After outputting the command "check", the microcomputer 11 waits for the command, which will be input from the PC 30, for the designated time measured by the time watching section 115, for one minute, for example (steps ST304 and ST305).

In this case, although the PC 30 receives from the onboard information equipment 10 the specific command "check" for switching to the check mode, it can ignore it in the processing. Alternatively, the PC 30 can notify that the onboard information equipment 10 is started by receiving the specific command "check".

When a certain command is input from the PC 30 within one minute after the onboard information equipment 10 is started, and the content of the command is the specific command "check" (step ST306 "Yes"); the onboard information equipment 10 is switched to the specific operation environment (check mode) the microcomputer 11 does not use normally (step ST307). In contrast, unless the input command is the specific command "check" (step ST306 "No"), the microcomputer 11 makes a decision as to whether it is another command or not (step ST308).

If the input command agrees with the prescribed command, the debug command, for example ("Yes" at step ST308), the function executing section 113 carries out the processing corresponding to that command (step ST309). Unless it matches the prescribed command ("No" at step ST308), the microcomputer 11 enters awaiting mode for the next command, again, and this mode continues for one minute.

Thus, if the specific command "check" is input from the PC 30 within one minute after starting the onboard information equipment 10, it is possible to set the onboard information equipment 10 (microcomputer 11) in the operation environment the microcomputer 11 does not use normally (check mode) in the same manner as in the case where the command return jig 20 is attached. In this case, it can accept other commands such as for executing the debug, diagnosis and the like, which cannot be executed by only connecting the command return jig 20.

More specifically, even after one minute has elapsed after the start in the processing at steps ST304 and ST305 ("Yes" at step ST305), the command input acquiring section 111 waits for the input of a command (step ST310). If a command is input here, the command deciding section 112 decides the content of the command (step ST311), and if it is a prescribed command ("Yes" at step ST311). the function executing section 113 executes the processing corresponding to that command (step ST312). Unless it is the prescribed command ("No" at step ST311), it waits for the next command (step ST310).

According to the foregoing processing, if the memory dump command is input from the PC 30 after starting the onboard information equipment 10, the command deciding section 112 decides its content at steps ST306 and ST308 if it is input within one minute, or at step ST310 if input after an elapse of one minute after the start. Then, if it makes a decision that it is the memory dump command ("YES" at step ST308 or "YES" at step ST311), the memory reading section 1130 in the function executing section 113 executes its processing.

The memory reading section 1130 reads out the data stored in the memory 13, and outputs the data to the PC 30 via the output section 114 and the communication interface unit 12. Thus, the PC 30 can acquire the dump list. In this way, the debug system can execute the diagnostic command such as a debug command independently of the waiting time within the designated time (one minute).

As described above, according to the embodiment 2 in accordance with the present invention, connecting the PC 30 working as the diagnostic apparatus to the equipment to be debugged like the onboard information equipment 10 makes it possible to input not only the specific command "check", but also other commands prepared for the debug or diagnosis; to set the onboard information equipment 10 serving as the equipment to be debugged in the specific operation environment the microcomputer 11 working as the control center does not use normally; and to achieve other functions of the debug and diagnosis Accordingly, connecting a device failed on an assembly line (malfunctioning equipment) to the PC 30 offline, followed by inputting a diagnostic command from the PC 30, enables detailed analysis of the malfunction occurred.

INDUSTRIAL APPLICABILITY

As described above, the debug system in accordance with the present invention is formed as a debug system capable of setting the microcomputer, which works as the control center of the equipment to be debugged, in the operation environment the microcomputer does not use normally by attaching a jig with a simple structure. Accordingly, the debug system is suitable for applications to diagnosis of the equipment such as onboard information appliances before factory shipment.

What is claimed is:

1. A debug system comprising:
    equipment to be debugged, which is controlled by a microcomputer; and
    a command return jig connected to the equipment to be debugged via a communication interface unit, for receiving a specific command generated and output by the microcomputer via the communication interface unit, and for providing an output which returns the specific command to the equipment to be debugged, wherein
    the equipment to be debugged switches, when receiving the specific command from the command return jig, the microcomputer to set the microcomputer in an operation environment the microcomputer does not use normally.

2. The debug system according to claim 1, wherein the equipment to be debugged:
    comprises a time watching section for watching a designated time from a moment at power-on following connection of the command return jig; and
    enables waiting for the specific command the command return jig outputs by return within the designated time.

3. The debug system according to claim 2, wherein the equipment to be debugged:
    receives the specific command output from the command return jig by return within the designated time; and
    comprises a lamp for displaying that the microcomputer is switched and set in the operation environment the microcomputer does not use normally.

4. The debug system according to claim 2, wherein the equipment to be debugged comprises:
    a second diagnostic function executing section for executing the specific command output from a diagnostic apparatus connected to the equipment to be debugged in place of the command return jig via the communication interface unit, and for executing a diagnostic command independent of the waiting within the designated time.

5. The debug system according to claim 1, wherein the equipment to be debugged comprises:
    a first diagnostic function executing section for conducting, when the microcomputer is switched and set in the operation environment the microcomputer does not use normally, equipment diagnosis in accordance with the specific operation environment based on the specific command.

6. The debug system according to claim 1, wherein the command return jig is a connection device external to the equipment to be debugged which, in combination with the communication interface unit, provides a connection between a command output section of the microcomputer that outputs the specific command, and a command input section of the microcomputer, the connection returning the outputted specific command from the command output section to the command input section.

7. The debug system according to claim 1, wherein the command return jig is a hardware tool external to the equipment to be debugged, comprising a driver circuit connected to a command output section and a command input section of the microcomputer via the communication interface unit, the driver circuit returning the outputted specific command from the command output section to the command input section.

* * * * *